United States Patent
Perkins, Jr. et al.

(10) Patent No.: US 10,891,812 B2
(45) Date of Patent: *Jan. 12, 2021

(54) UNIVERSAL BARRIER OPERATOR TRANSMITTER

(71) Applicant: GMI Holdings, Inc., Mount Hope, OH (US)

(72) Inventors: Donald Y. Perkins, Jr., Richardson, TX (US); LeRoy G. Krupke, Carrollton, TX (US); Brent Buescher, Jr., Wooster, OH (US)

(73) Assignee: GMI Holdings, Inc., Mount Hope, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,705

(22) Filed: Apr. 9, 2020

(65) Prior Publication Data

US 2020/0234519 A1    Jul. 23, 2020

Related U.S. Application Data

(63) Continuation of application No. 16/153,490, filed on Oct. 5, 2018, now Pat. No. 10,643,411.

(51) Int. Cl.
G07C 9/00 (2020.01)
G06F 7/535 (2006.01)

(52) U.S. Cl.
CPC ......... *G07C 9/00309* (2013.01); *G06F 7/535* (2013.01); *G07C 2009/00492* (2013.01)

(58) Field of Classification Search
None
See application file for complete search history.

(56) References Cited

U.S. PATENT DOCUMENTS

| | | | |
|---|---|---|---|
| 5,564,101 | A | 10/1996 | Eisfeld et al. |
| 5,680,134 | A | 10/1997 | Tsui |
| 5,790,948 | A | 8/1998 | Eisfeld et al. |
| 5,841,390 | A | 11/1998 | Tsui |
| 6,005,508 | A | 12/1999 | Tsui |
| 6,154,544 | A | 11/2000 | Farris et al. |
| 6,486,795 | B1 | 11/2002 | Sobel et al. |
| 6,690,796 | B1 | 2/2004 | Farris et al. |
| 6,810,123 | B2 | 10/2004 | Farris et al. |
| 6,980,655 | B2 | 12/2005 | Farris et al. |
| 7,039,397 | B2 | 5/2006 | Chuey |
| 7,050,794 | B2 | 5/2006 | Chuey et al. |
| 7,057,494 | B2 | 6/2006 | Fitzgibbon |
| 7,071,850 | B1 | 7/2006 | Fitzgibbon et al. |
| 7,181,174 | B2 | 2/2007 | Fitzgibbon et al. |
| 7,181,203 | B2 | 2/2007 | Gregori |
| 7,254,182 | B2 | 8/2007 | Tsui |
| 7,412,056 | B2 | 8/2008 | Farris et al. |
| 7,447,498 | B2 | 11/2008 | Chuey et al. |

(Continued)

*Primary Examiner* — K. Wong
(74) *Attorney, Agent, or Firm* — Haynes and Boone, LLP

(57) ABSTRACT

A controller for a door operator including a processor, a first actuator, and a transmitter, and associated method. The method may include inverting bit positions of a rolling code, dividing the inverted code by a predetermined number, converting the divided inverted code to base 9 coefficients, and substituting an output nibble for each base 9 coefficient in the divided converted code. The transmitter may be configured to transmit the substituted output nibble responsive to actuation of the first actuator.

20 Claims, 4 Drawing Sheets

(56) References Cited

U.S. PATENT DOCUMENTS

| | | |
|---|---|---|
| 7,489,922 B2 | 2/2009 | Chuey et al. |
| 7,492,898 B2 | 2/2009 | Farris et al. |
| 7,492,905 B2 | 2/2009 | Fitzgibbon |
| 7,561,075 B2 | 7/2009 | Fitzgibbon et al. |
| 7,610,030 B2 | 10/2009 | Fitzgibbon et al. |
| 7,623,663 B2 | 11/2009 | Farris et al. |
| 7,741,951 B2 | 6/2010 | Fitzgibbon |
| 7,899,130 B2 | 3/2011 | Tsui |
| 8,055,219 B2 | 11/2011 | Jenkins et al. |
| 8,194,856 B2 | 6/2012 | Farris et al. |
| 8,207,818 B2 | 6/2012 | Keller, Jr. |
| 8,233,625 B2 | 7/2012 | Farris et al. |
| 8,284,021 B2 | 10/2012 | Farris et al. |
| 8,325,008 B2 | 12/2012 | Keller et al. |
| 8,422,667 B2 | 4/2013 | Fitzgibbon et al. |
| 8,536,977 B2 | 9/2013 | Fitzgibbon |
| 8,610,547 B2 | 12/2013 | Keller et al. |
| 8,633,797 B2 | 1/2014 | Farris et al. |
| 9,148,409 B2 | 9/2015 | Fitzgibbon et al. |
| 9,432,298 B1 * | 8/2016 | Smith ................. H04L 49/9057 |
| 10,643,411 B1 * | 5/2020 | Perkins, Jr. ........ G07C 9/00309 |

* cited by examiner

Example a first rolling code Sequence

| starting sequence | | | sequence identifiers | | message content |
|---|---|---|---|---|---|
| 0000000000000000 | 1111 | 0X00 | XXXX | 1001 | BCA BCA BCA BCA BCA BCA BCA BCA BCA BCA |
| 16 Manchester symbols 0 | 4 Manchester symbols 1 | sequence number 4 Manchester symbols X is 0 for 1st sequence X is 1 for 2nd sequence other symbols are 0 | triplet data order identifier 4 Manchester symbols their values are tree | triplet inverter 4 Manchester symbols it is locked to 1001 to have no inversions in triplets | or<br>EFD EFD EFD EFD EFD EFD EFD EFD EFD EFD<br>message content 30 Manchester symbols grouped in 10 triplets<br>data on triplets are chosen on this way<br>for 1st sequence<br>A 10 bits from serial number byte 0 shifted to left by 2 and padded with two 0 bits at right<br>B 10 bits from serial number byte 1 shifted to left by 2 and padded with two 0 bits at right<br>C 10 bits from serial number byte 2, shifted to left by 2 and padded at right with the two less significant bits of rolling data byte 4.<br>for 2nd sequence<br>D 10 bits from serial number byte 2, shifted to left by 2 and padded with two 0 bids at right<br>E 10 bits from serial number byte 3, shifted to left by 2 and padded with two 0 bids at right<br>F 10 bits from 8 bits of rolling data byte 3, shifted to left by 2 and padded at night with the two less significant bits of rolling data byte 4, after rolling data byte 4 has been shifted to right by 2.<br>Here the example is depicted for triplet data inverter XXXX=0100 |

FIG. 5

UNIVERSAL BARRIER OPERATOR TRANSMITTER

CROSS-REFERENCE TO RELATED APPLICATIONS

This application is a continuation of U.S. application Ser. No. 16/153,490 filed Oct. 5, 2018.

TECHNICAL FIELD

This patent disclosure relates generally to barrier operator transmitters and, more particularly, to universal barrier operator transmitters that can operate a variety of barrier operators from a variety of different manufacturers.

BACKGROUND

Barrier operators such as those that operate gate operators, garage doors, or warehouse doors, are often operated by remote transmitters. The remote transmitters may be kept in vehicles so as the vehicle approaches the barrier, the vehicle operator may articulate the remote transmitter to open the barrier to allow the vehicle to pass.

Remotes originally supplied with barrier operator systems may be limited in number, and may potentially raise issues with operability of the system. For example, remote transmitters may become broken, worn out, or lost. Further, several vehicles may use the same barrier system, thus needing more remote transmitters than what was originally supplied in order to provide a remote transmitter for each vehicle.

In addition, the same vehicles may need access to areas controlled by different barrier systems. For example, different garage bays may be accessed by doors controlled by barrier operators from different manufactures or different models from the same manufacturer and commercial vehicles may access various warehouses having barriers operated by operators from different manufacturers or different models from the same manufacturer.

In order to provide security, many barrier operators have security features to ensure that only authorized remote transmitters can communicate with the barrier operator controller to operate the barrier. Codes may be employed to ensure only authorized (verified by authentication) communication occurs between the remote transmitter and the barrier operator. Fixed codes, rolling codes, and a combination of fixed and rolling codes may be used. Many manufacturers use different code schemes for their barrier operator systems. As a result, it may be difficult for a single transmitter to be able to communicate with a variety of barrier operator systems. Further, a remote transmitter that can operate any barrier operator may be a security risk. If such a remote transmitter were available, an unscrupulous person could obtain one and have access to nearly any secured space controlled by a remote controlled barrier operator.

SUMMARY

The systems and methods described herein provide embodiments of a remote transmitter that can be obtained separately from a barrier operator system that can be configured to potentially operate with a variety of barrier operator systems, and also only work with those systems for which the possessor of the remote transmitter is authorized to use. Such a remote transmitter may, in some embodiments, a remote transmitter can be obtained separately from a barrier operator system that can be configured to potentially operate with a variety of barrier operator systems, but also only work with those systems for which the possessor of the remote transmitter is authorized to use.

In one aspect, the disclosure describes a method for generating a rolling code using base 9 for use in moving a barrier. The method includes: providing a barrier operator controller having a processor operatively connected to a transmitter and a first actuator; configuring the processor to: provide a rolling code expressed in 32 bits; invert the bit positions; divide the bit positions by 16; convert the quotient to 4 bit base 9 coefficients; and substitute 4 bit output nibble for each 4 bit base 9 coefficient; and configuring a transmitter to transmit the substituted 4 bit output nibble for each 4 bit base 9 coefficient when the first actuator is actuated.

In another aspect, the disclosure describes a portable controller for a door operator. The controller includes: a processor configured to: process a rolling code expressed in 32 bits; invert the bit positions of the rolling code; divide the inverted bit positions by 16; convert the quotient to four bit base 9 coefficients; and substitute 4 bit output nibble for each 4 bit base 9 coefficient in the converted code; a first actuator operatively connected to the processor; a transmitter operatively connected to the processor, configured to transmit the substituted 4 bit output nibble for each 4 bit base 9 coefficient when the first actuator is actuated; a receiver operatively connected to the processor; and a memory operatively connected to the processor.

In another aspect, the disclosure describes a portable controller for a door operator. The controller includes: a processor configured to: process a rolling code expressed in 32 bits; invert the bit positions of the rolling code; divide the inverted bit positions by 16; convert the quotient to four bit base 9 coefficients; and substitute 4 bit output nibble for each 4 bit base 9 coefficient in the converted code; a first actuator operatively connected to the processor; an LED operatively connected to the processor and configured to illuminate as directed by the controller; a transmitter operatively connected to the processor with an $i^2c$ bus, configured to transmit the substituted 4 bit output nibble for each 4 bit base 9 coefficient when the first actuator is actuated; a transmit antenna operatively connected to the transmitter; a receiver operatively connected to the processor with a SPI bus; a receive antenna operatively connected to the receiver; and a memory operatively connected to the processor.

In another aspect, the disclosure describes an apparatus, comprising a portable controller for a door operator. The portable controller includes a processor, a first actuator operatively connected to the processor, and a transmitter operatively connected to the processor. The processor is configured to: invert bit positions of a 32 bit rolling code; divide the inverted code by 16; convert the divided inverted code to four bit base 9 coefficients; and substitute a 4-bit output nibble for each four bit base 9 coefficient in the divided converted code. The transmitter is configured to transmit the substituted 4-bit output nibble responsive to actuation of the first actuator.

In another aspect, the disclosure describes an apparatus, comprising a portable controller for a door operator. The portable controller includes a processor configured to process a rolling code expressed in 32 bits by: inverting bit positions of the rolling code; dividing the inverted code by 16; converting the divided inverted code to four bit base 9 coefficients; and substituting a 4-bit output nibble for each four bit base 9 coefficient in the divided converted code. The portable controller also includes a first actuator operatively connected to the processor. The portable controller also includes an LED operatively connected to the processor and configured to illuminate as directed by the processor. The portable controller also includes a transmit antenna; and a transmitter operatively connected to the processor with an inter-integrated circuit ($i^2c$) bus, configured to transmit each substituted 4-bit output nibble, via the transmit antenna, responsive to actuation of the first actuator. The portable controller also includes a receiver operatively connected to the processor with a serial peripheral interface (SPI) bus; and a receive antenna operatively connected to the receiver. The portable controller also includes a memory operatively connected to the processor.

In another aspect, the disclosure describes a method for controlling a moving barrier. The method includes generating, by a processor of a barrier operator controller, a plurality of 4-bit output nibbles from a 32 bit rolling code by: inverting bit positions of the rolling code; dividing the inverted code by 16; converting the divided inverted code to four bit base 9 coefficients; and substituting each of a plurality of four bit base 9 coefficients in the divided converted code with a 4-bit output nibble. The method also includes, responsive to actuation of a first actuator of the barrier controller operator, transmitting, by a transmitter of the barrier operator controller to a receiver of a barrier operator, the plurality of 4-bit output nibbles, receipt of the plurality of 4-bit output nibbles causing the barrier operator to actuate a motor connected to a moving barrier.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the systems and methods described herein are not limited in their application to the details of construction and to the arrangements of the components set forth in the following description or illustrated in the drawings. The systems and methods described herein are capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 5 is a table showing a first rolling code sequence.

DETAILED DESCRIPTION

Figure 1:
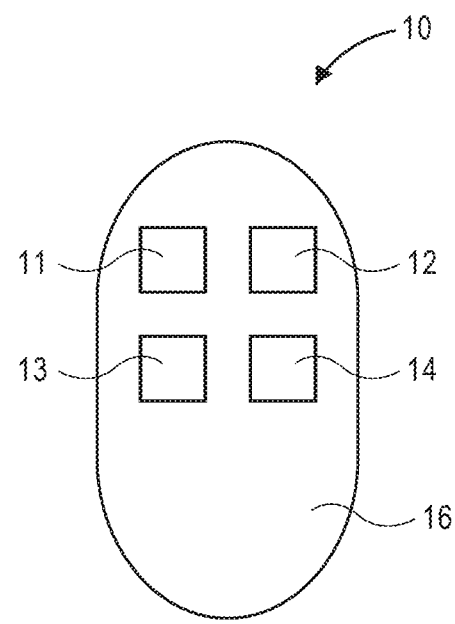
FIG. 1 is a top view of a remote control transmitter in accordance with an embodiment of the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

Figure 2:
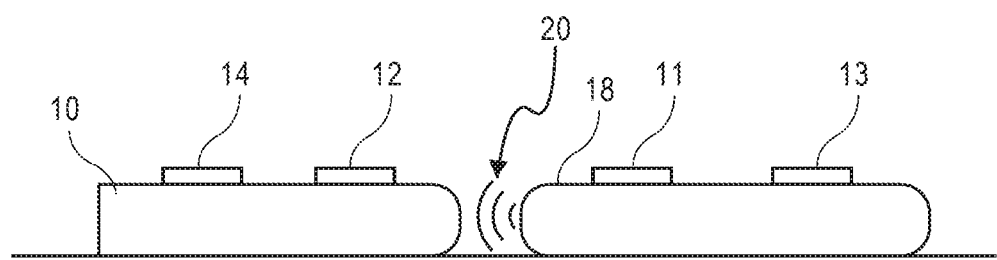
FIG. 2 is a side view of the remote control transmitter of FIG. 1 receiving a transmission from an already learned transmitter.

FIG. 1 is a top view of a transmitter 10 in accordance with an embodiment of this disclosure. The transmitter 10 includes buttons 11, 12, 13, and 14 located in a housing 16. The transmitter 10 may be programmed to operate a particular barrier operator system by a remote transmitter 18 already paired with the barrier operator system as illustrated in FIG. 2 and described further below. Using an already learned transmitter 18 to send a signal to the transmitter 10 to help configure the transmitter 10 is one way to help ensure the possessor of the transmitter 10 is authorized to use a barrier operator because the user needed to have possession of an already learned transmitter 18. The already paired transmitter 18 can transmit signals illustrated by waves 20 to the transmitter 10 to be paired as discussed in more detail below.

Figure 3:
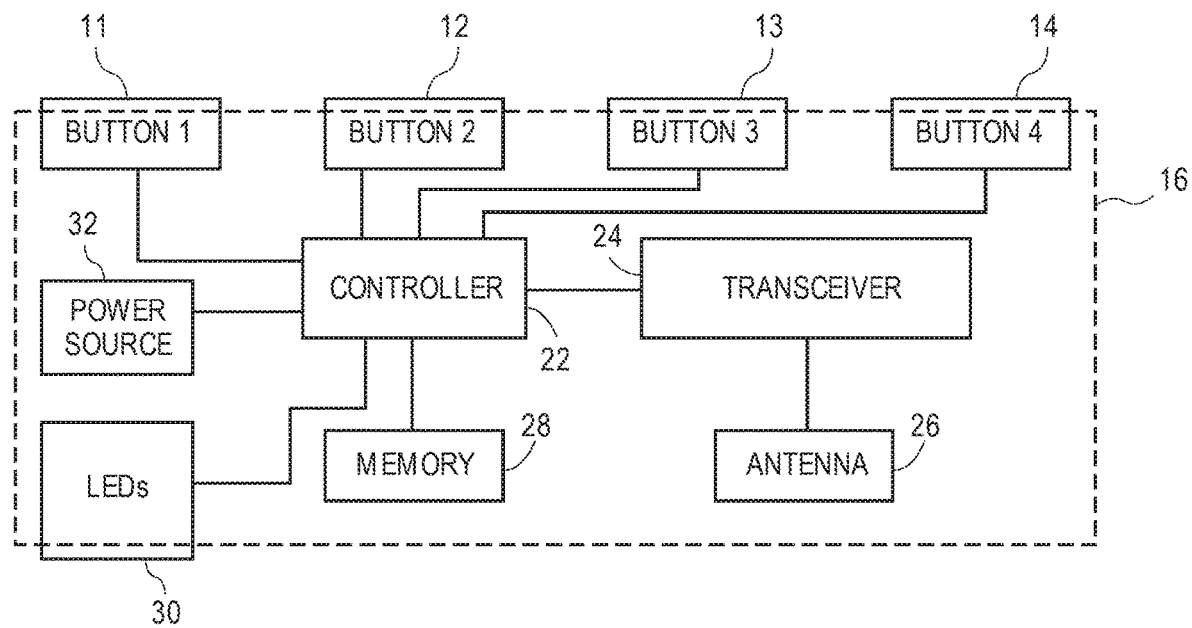
FIG. 3 is a schematic diagram of a remote control transmitter in accordance with an embodiment of the present disclosure.

FIG. 3 is a schematic diagram of a transmitter 10 in accordance with the present disclosure. The transmitter 10 includes a controller 22 which may be a microcontroller 22. The controller 22 is connected to a transceiver 24. The transceiver 24 is connected to an antenna 26. The controller 22 is connected to a memory 28.

Optionally, the controller 22 is connected to an LED 30 or LEDs 30 for providing feedback to a user. In some embodiments, the LED 30 or LED's 30 may be used to indicate by lighting up and/or changing color that the one of the buttons 11, 12, 13, or 14 has been pressed. The LED 30 or LED's 30 may also light up and/or change color to indicate that the transmitter 10 has received data from an already learned transmitter 18. Different lights or colors may indicate different meanings to a user. Some specific examples are discussed later below.

Figure 4:
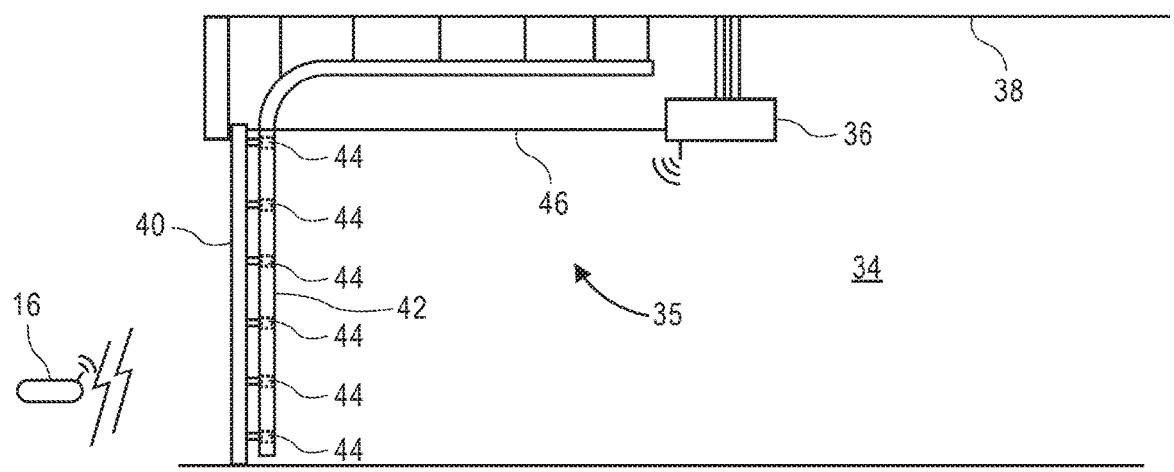
FIG. 4 is a side view of a garage, garage door, and operator that is controlled by a remote control transmitter in accordance with the present disclosure.

FIG. 4 is a side view of a garage 34 having a garage door operating system 35. The operating system 35 includes a barrier operator 36 mounted to the ceiling 38 of the garage 34. The barrier operator 36 is operatively connected to a garage door 40. The garage door 40 is mounted in tracks 42 via wheel assemblies 44. A mechanical door actuator 46 which may include a chain drive, belt drive, screw drive, or any other suitable drive mechanism operatively connects the garage door 40 to the barrier operator 36. It will be understood that a garage door 40 is only one non-limiting example barrier 40 that may be operated by the remote transmitter 10. Other barriers 40 such as, but not limited to, gates, security obstacles, windows or other doors, can also be actuated by a transmitter 10 in accordance with this disclosure and be literally within the scope of the claims.

The operation, pairing, and programming of the transmitter 10 will now be explained. The transmitter 10 is a handheld transmitter 10 capable of communicating with, and having its door control commands accepted and responded to by, the designated model of the particular garage door opener 36. In order for the transmitter 10 to communicate with a particular model garage door opener 36, it is programmed. The transmitter 10 has two modes in which it may be programmed, namely a "standard" programming mode and an "advanced" programming mode.

The "standard" programming mode functions, in general, by placing the transmitter 10 into its learn mode, storing the code transmitted from an existing already trained transmitter 18 (See FIG. 2), and then examining the bits of the so-stored code to determine the code type (i.e., the type of code that is associated with the specific designated model of garage door opener of the particular company). While the term "already trained transmitter 18" is used in the application, it should be understood that the transmitter 18 need not be already trained or paired. The transmitter 18 could also be just the correct type for the opener it will be used with. As such, the term "already trained transmitter" should be interpreted to also include paired transmitters and/or any transmitter 18 of the correct type to be used with a particular operator.

Several example codes will now be explained. Where the type of code received from the already trained transmitter 18 is a first rolling code, the transmitter 10 then builds from scratch a new rolling code having the same code type as the first rolling code transmitted from the existing trained transmitter 18.

The examples set forth herein have different code types, different rolling code types and a fixed code type. Alternatively, where the code type of the transmitted code from the existing already trained transmitter 18 is determined to be a fixed code, or where the code type cannot be determined (meaning that the code is an unknown code) the transmitted code remains stored in the memory 28 see FIG. 3 for subsequent transmission.

The "advanced" programming mode functions by allowing user input to directly select which type of code is to be programmed. In the advanced programming mode, a new code is built based upon the user-selected type of code to be programmed.

The transmitter 10 has four user-actuated buttons labeled 11-14. The user can enter the standard programming mode by depressing the 11 button of the transmitter 10 while depressing the 12 button four times of the transmitter 10. Other embodiments may employ other button combinations. After this, an indicator LED 30 starts blinking slowly, indicating the transmitter 10 to be in its learn mode, and the user then transmits the code from the existing already trained transmitter 18 toward, and from a distance of about one inch from, the head of the transmitter 10 as shown in FIG. 2 (not drawn to scale).

When the code from the existing already learned transmitter 18 is received by the transmitter 10, the transmitter 10 first determines the type of transmission (e.g., frequency, modulation type, etc.). After the transmission type has been determined, then the transmitter 10 proceeds to determine the code type by attempting to match fixed bits from the received code (e.g., the fixed preamble) with known fixed bits and to match the total number of bits to a known total number of bits. If the determination cannot be made from these bits, then the code is recognized as a known fixed code or an unknown code, and is stored in memory 28 for later transmission.

After the transmitted code from the existing already trained transmitter has been received, stored, and the code type determined, an LED 30 of the transmitter 10 indicates such by blinking quickly, notifying the user to depress the key 11, 12, 13, or 14 on the transmitter 10 indicating to which garage door opener the user wishes to map the code. As a result, a code that is the same as the code transmitted by the existing already learned transmitter, in the case of a fixed code, or a code of the same type of code as transmitted by the already learned transmitter 18, but with a different serial number, in the case of a rolling code, will be generated, stored in memory 28, and associated with the mapped garage door opener.

The processing of rolling codes is now described, in greater detail. For a first rolling code, the transmitter 10 may use the following process: (1) the previously used rolling code (or the rolling code provided during initialization), which is expressed as a 32 bit binary word, is incremented by one; (2) the bit positions of the incremented 32 bit binary word are then inverted; (3) the inverted 32 bit binary word is then divided by 16; (4) after division by 16, the 32 bit binary word is then converted into base 9; and (5) each base 9 coefficient is then converted into binary using a lookup table that substitutes a 4 bit binary output nibble for each base 9 coefficient. The result is 10 sets of 4 bits, each of which is a binary coded representation of a base 9 coefficient. Of these 10 sets of 4 bits, the 4 least significant bits are used for sequence identifiers, sets 0 and 1 for the first sequence, sets 2 and 3 for the second sequence.

No conversion of binary into ternary is involved. Each valid rolling code is stored in memory 28 for future transmission.

To create the data package for transmission to the receiver a valid rolling code is chosen from memory 28 for transmission. Elements of this rolling code and the transmitter ID are used to form message and sequence identifiers as described in the following format, more details of which are described in accompanying FIG. 5.

Of note is that the recovery identifier is formed from portions of the first rolling code itself, which is divided into portions used to form the recovery identifier and into other portions used to form message content. As a result, the portions of the first rolling code in the transmitted message content do not have a relationship with the recovery identifier. All base conversions are between base-2 and base-9.

Some implementations of barrier operator systems that do not comprise the systems and methods discussed herein use a trinary to binary conversion of data during the processing and/or transmitting code to a barrier operator. Such conversions are complex and use processing time and capacity of the processor/controller. In accordance with the present disclosure, no trinary to binary conversion of data occurs. In fact, the data is never in a trinary format. Rather a base 9 implementation of the rolling codes are used. This provides several advantages including requiring fewer steps and using less processing time and capacity of the processor/controller, resulting in the processor/controller being able to operate more quickly. Two example implementations using base 9 are described below.

A detailed example of transformation of a first rolling code scheme is now described. Start with rolling code equal 1 and increment by 1 each time. Each rolling code is expressed in 32 bits. For each rolling code—

1) Invert the bit positions
2) Divide by 16
3) Convert to base 9 coefficients. Each of which is 4 bits.
4) Substitute via lookup table 4 bit output nibble for each 4 bit base 9 coefficient. This results in 10 sets of 4 bits each of which is a coded representation of a base 9 coefficient.

The 10 4 bit codes=40 bits=5 bytes to hold rolling code. See Table 1 below.

TABLE 1

Detail of conversion and representation of rolling codes.

For the rest of this analysis assume rolling code = 12413
In binary (32 bits) = 00000000000000000011000001111101 (base 2)
Invert bit position = 10111110000011000000000000000000
Divide by 16 = 1011111000001100000000000000
Convert to base 9

10 base 9 coefficients
---6--  --4-
045587 1747 (base 9)

Memory Layout of rolling code 12413 after it has undergone inversion of the order of the bits and translation in base 9. See Tables 2 and 3. Below.

TABLE 2

| Binary representation of 6 most significant coefficients "Message Content" | | | Binary representation of 4 least significant coefficients "Sequence Identifiers" | | |
|---|---|---|---|---|---|
| Byte 4 | Byte 3 | Byte 2 | Byte 1 | Byte 0 | |
| 6 most significant | | | Identifier 2 | Identifier 1 | |
| 9-8 | 7-6 | 5-4 | 3-2 | 1-0 | coefficient # |
| 0 4 | 5 5 | 8 7 | 1 7 | 4 7 | Base 9 |
| 00000101 | 01100110 | 10101001 | 00011001 | 01011001 | Binary[1] |

[1] Base 9 coefficients are converted to binary symbols via the following lookup table.

TABLE 3

Base 9 coefficient to 4 bit binary symbol lookup table

| Base 9 coefficient | | 4 bit binary symbol | |
|---|---|---|---|
| Decimal | 4 bit binary | Decimal | 4 bit binary |
| 0 | 0000 | 0 | 0000 |
| 1 | 0001 | 1 | 0001 |
| 2 | 0010 | 2 | 0010 |
| 3 | 0011 | 4 | 0100 |
| 4 | 0100 | 5 | 0101 |
| 5 | 0101 | 6 | 0110 |
| 6 | 0110 | 8 | 1000 |
| 7 | 0111 | 9 | 1001 |
| 8 | 1000 | 10 | 1010 |

The base 9 coefficient in column one is used to lookup the 4 bit binary symbol from the last column.

Sequence Identifiers

The 4 least significant coefficients=$1747^{(base9)}$ "are used for sequence identifiers (coefficients 1-0 for the first sequence, coefficients 3-2 for the second sequence)" See Table 4 below:

TABLE 4

Transmission Characteristic

| | 2nd Recovery/ Sequence Identifier | | 1st Recovery/ Sequence Identifier | |
|---|---|---|---|---|
| Coefficient index# | 3 | 2 | 1 | 0 |
| Base9 coefficients | 1 | 7 | 7 | 4 |
| Stored as 4 bit binary symbols[1] = | 0001 | 1001 | 0101 | 1001 |

Sequence Identifier1 (1byte) = $47^{(base9)}$ = 01011001 binary
"4 msb bits carries data order method"
"4 lsb bits carries inversion method" (Always $7^{(base9)}$ or 1001 in binary, due to selection of rolling code.)
Sequence Identifier2 (1byte) = $17^{(base9)}$ = 00011001 binary
"4 msb bits carries data order method"
"4 lsb bits carries inversion method" (Always $7^{(base9)}$ or 1001 in binary, due to selection of rolling code.)

The possible values for the sequence identifier data order nibble (4 msb bits) are $0^{(base9)}$ through $8^{(base9)}$. 6 possible orderings of bits in a 'triplet' as follows—in Table 5 below.

TABLE 5

| |
|---|
| ABC |
| ACB |
| BCA |
| BAC |
| CAB |
| CBA |

In fact, in the example, methods 2&8, 3&6 and 5&7 are identical, which yields the 6 methods in use.

Message Content

The 6 most significant coefficients=$045587^{(base9)}$ are transmitted in their binary expression, splitting the two sequences together with the serial number of the transmitter to form the 20 triplets (10 triplets for any sequence). See Table 6 below.

TABLE 6

| Coefficient index | 9 | 8 | 7 | 6 | 5 | 4 |
|---|---|---|---|---|---|---|
| Base9 coefficients | 0 | 4 | 5 | 5 | 8 | 7 |
| Stored as 4 bit binary symbols[1]= | 0000 | 0101 | 0110 | 0110 | 1010 | 1001 |

TABLE 6-continued

Sequence Content 1 is formed from these 10-bit values:
A = first byte of serial number shifted left by 2 to make a 10-bit number
B = second byte of serial number shifted left by 2 to make a 10-bit number
C = first byte of 3 byte representation of 6 most significant coefficients of rolling code shifted left by 2 to make a 10-bit number, ORed with 2 lsb bits from 3rd rolling code byte.
Sequence Content 2 is formed from these 10-bit values:
A = third byte of serial number shifted left by 2 to make a 10-bit number
B = fourth byte of serial number shifted left by 2 to make a 10-bit number
C = second byte of 3 byte representation of 6 most significant coefficients of rolling code shifted left by 2 to make a 10-bit number, ORed with bits 2 and 3 from 3rd rolling code byte shifted right by 2.

Note:
These 10 bit values A, B & C are internally represented in 16 bit variables using bits 9-0

For each of the two sequence message contents, 10 'triplets' are formed—"message contents are divided in 10 triplets, and in any triplet is applied a scheme of transmission order of the triplet (for examples A,B,C; B,A,C; C,B,A etc.) and a scheme of inversion of the bits (for example A, not B, not C; not A, B, not C; etc)."

The most significant bit (bit 9) of each of the three 10-bit values A, B & C are combined into a 'triplet' using the bit ordering and inversion specified by the computed sequence identifier. A, B & C are then each shifted left by 1 to bring the next bit into position, and the process repeats 10 times resulting in the 10 triplets of the sequence message content.

The 'triplet' is actually created directly into a radio transmit buffer which is organized as a stream of bits in Manchester encoding. The radio transmit buffer ultimately contains framing and spacing as well as the two sequence messages each of which is made up of the ten triplets generated as above.

Where a fixed code is selected in the advanced programming mode, the code is built from scratch.

Figure 6:
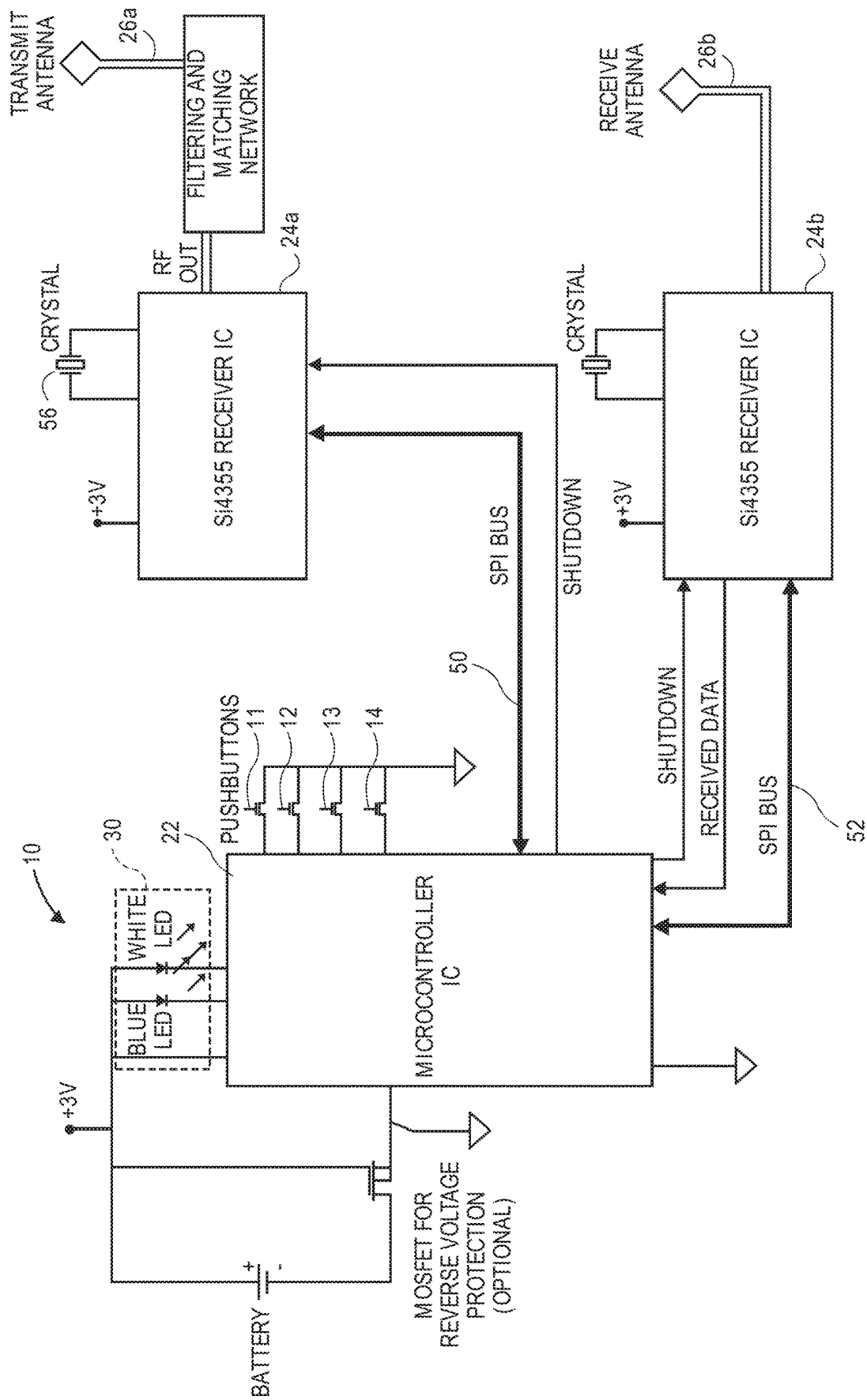
FIG. 6 is a schematic diagram of a specific remote control transmitter in accordance with an embodiment of the present disclosure.

The hardware of another embodiment of the transmitter 10 is now described with response to FIG. 6. The transmitter 10 includes a main microcontroller 22 performing most of the described functions with the exception of the specific transmissions or receptions of the garage door operator codes. A Silicon Laboratories' Si4012 IC 24a coupled to the microcontroller 22 via an I²C 50 bus is used for transmission duties. Of particular note is that this Si4012 IC 24a does not utilize a phase locked loop (PLL) of any kind in generating transmissions. Instead, the Si4012 IC 24a uses an LC oscillator and a programmable divider to generate transmissions. A Silicon Laboratories" Si4355 24b coupled to the microcontroller 22 via an SPI 52 bus is used for reception duties.

Also of note is that the tuning of the antenna 26a is performed by a tuner that receives its control signals from a digital logic block of the Si4012 IC 24a. A synthesizer receives control signals from the digital logic block and generates a transmission signal accordingly in response thereto. This transmission signal is amplified by a power amplifier, and then fed to the tuner. The synthesizer provides no signal, voltage signal or otherwise, that affects the tuning.

A universal transmitter 10 shown in FIG. 6, has a separate transmitter 24a and receiver ICs 24b. The transmitter 10 is a compact multi-frequency, multi-protocol accessory RF remote control transmitter 10 that incorporates a microcontroller 22 and a transceiver 24 (or transmitter 24a and receiver 24b) with a PLL-based programmable frequency synthesizer. The remote controller 10 uses a transmitter IC 24a that does not incorporate a PLL. The Si4012 transmitter 24a, a low-cost IC, is suited to this purpose. A separate receiver IC 24b, in this case the SiLabs Si4355 receiver 24b, is used. The PIC microcontroller 22 may be used. Some embodiments may use the ST8L151G6 microcontroller 22 (32K flash, 2K RAM, 1K EEPROM) other embodiments may use the PIC18LF26K40 (64K flash, 3,728 bytes RAM, 1K EEPROM) or the PIC32MM0064GPM028 (64K flash, 16K RAM).

In the transmitter 10 is depicted in FIG. 6, the 3V lithium coin cell is used. An n-channel depletion-mode MOSFET 54 is optionally placed in the return path to the battery 32 to provide low-dropout reverse voltage protection, depending on how well the battery holder (not shown) provides such protection in its physical design.

The microcontroller 22 controls the transmitter 24a and receiver 24b, responds to pushbutton I/O switches 11,12, 13, 14, indicates state through the LEDs 30, and manages power for the system 10. In idle states, the microcontroller 22 places the Si4012 transmitter IC 24a and the Si4355 receiver IC 24b into lower-power shutdown modes using the provided shutdown lines before itself going into a low power sleep mode. From the sleep mode it wakes on change of the pushbutton 11, 12, 13, 14 inputs, so the pushbuttons 11, 12, 13, 14 are attached to I/O pins that provide for interrupt (wake) on change, and may be attached to pins that provide internal pull-ups to eliminate external pull-up resistors to minimize parts count and circuit area. The Si4012 transmitter IC 24a is connected to the microcontroller 22 by a two wire I²c bus interface 50, and the Si4355 receiver 24b is connected to the microcontroller 22 by a three-wire SPI bus interface 52.

Some embodiments may use a ST ST8L151G6 microcontroller 22 (32K flash, 2K RAM, 1K EEPROM). Other embodiments may use the next step up in 28-pin microcontrollers 22 from Microchip to be the PIC18LF26K40 (64K flash, 3,728 bytes RAM, 1K EEPROM) and the PIC32MM0064GPM028 (64K flash, 16K RAM). Other embodiments may use an IC with larger pin count.

The Si4012 transmitter IC 24a provides a frequency agile transmitter controlled by the I²C bus 50, an adjustable power amplifier with maximum output of 10 dBm, and automatic antenna tuning. The antenna design 26a may be either a simple loop or the double loop. It is possible to implement Si4012-based transmitters 24a with little or no matching or filtering components, but to provide best performance in this compact design, some embodiments may choose to forgo the use of the antenna tuning features of the Si4012 24a and implement a low-pass filter to suppress transmitter harmonics and a broadband match to the antenna 26a. Due to the unique design of the Si4012 frequency synthesizer 24a, the external crystal 56 depicted in the block diagram is not strictly required.

The Si4355 receiver 24b provides a frequency agile receiver suitable for 300-400 MHz band. The antenna 26b design for the receiver 24b may be minimal with few or no matching or filtering components since its intended use is near-field reception of a remote for cloning. The Si4355 24b is controlled by the microcontroller 22 over its SPI bus interface 52 and outputs RF baseband data on one of its GPIO pins to the microcontroller 22 for decoding.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

We claim:

1. An apparatus, comprising:
a portable controller for a door operator, comprising a processor, a first actuator operatively connected to the processor, and a transmitter operatively connected to the processor;
wherein the processor is configured to:
invert bit positions of a rolling code,
divide the inverted code by a predetermined number,
convert the divided inverted code to base 9 coefficients, and
substitute an output nibble for each base 9 coefficient in the divided converted code; and
wherein the transmitter is configured to transmit the substituted output nibble responsive to actuation of the first actuator.

2. The apparatus of claim 1, wherein the portable controller further comprises a memory storing a lookup table of substitutions between each of a plurality of base 9 coefficient values and a corresponding plurality of output nibbles; and
wherein the controller is configured to substitute the output nibble in the divided converted code according to the lookup table.

3. The apparatus of claim 1, wherein the transmitter is further configured to transmit the substituted output nibble to a receiver associated with a barrier operator, receipt of the substituted output nibble causing the barrier operator to send a control signal to a motor associated with the barrier to cause the barrier to stop, move toward an open position, or move toward a closed position.

4. The apparatus of claim 1, wherein the portable controller further comprises a second actuator; and
wherein the processor is further configured to enter into a standard programming mode, responsive to continuous actuation of the first actuator and simultaneous repeated actuation of the second actuator.

5. The apparatus of claim 4, wherein the portable controller further comprises a receiver configured to receive a code from another controller while the processor is in the standard programming mode.

6. The apparatus of claim 1, wherein the portable controller further comprises a receiver;
wherein the receiver is configured to receive a code from another controller; and
wherein the processor is further configured to derive the rolling code from the code received from the other controller.

7. The apparatus of claim 1, wherein the portable controller further comprises a first LED operably connected to the processor and configured to illuminate responsive to actuation of the first actuator or a second actuator operably connected to the processor.

8. The apparatus of claim 7, wherein the first LED is configured to illuminate responsive to actuation of the first actuator; and
wherein the portable controller further comprises a second LED operably connected to the processor and configured to illuminate responsive to actuation of the second actuator.

9. A system, comprising:
the apparatus of claim 1; and
a barrier opener configured to:
receive the substituted output nibble from the transmitter;
verify the substituted output nibble; and
open a door responsive to verifying the substituted output nibble.

10. An apparatus, comprising:
a portable controller for a door operator, comprising:
a memory configured to store a plurality of rolling codes;
a processor operatively connected to the memory and configured to process a rolling code of the plurality of rolling codes for transmission;
at least one actuator operatively connected to the processor; and
a transceiver operatively connected to the processor and configured to transmit an encoded representation of the rolling code responsive to actuation of the at least one actuator;
wherein the processor is operable in each of a standard programming mode and an advanced programming mode, the processor configured to examine bits of a received code from a trained transmitter to determine a code type when operating in the standard programming mode, the processor configured to receive the code type by input from a user via the at least one actuator when operating in the advanced programming mode.

11. The apparatus of claim 10, wherein the processor is configured to build the plurality of rolling codes based upon the code type.

12. The apparatus of claim 11, wherein the processor is configured to process the rolling code by:
inverting bit positions of a selected rolling code to generate an inverted code;
dividing the inverted code by a predetermined number to generate a divided code;
converting the divided code to base 9 coefficients to generate converted code; and
substituting an output nibble for each of the base 9 coefficients to generate the encoded representation of the rolling code.

13. The apparatus of claim 10, wherein the processor is configured to examine the bits of the received code by determining a type of transmission associated with the received code.

14. The apparatus of claim 13, wherein the type of transmission comprises at least one of a frequency or a modulation type.

15. The apparatus of claim 10, wherein the processor is configured to determine the code type by matching fixed bits from the received code with known fixed bits of a known code type.

16. The apparatus of claim 15, wherein the processor is further configured to determine the code type by matching a total number of bits of the received code with a known total number of bits associated with a known code type.

17. A system, comprising:
the apparatus of claim 10; and
a barrier opener configured to:
- receive the encoded representation of the rolling code from the transceiver;
- verify the encoded representation of the rolling code; and
- open a door responsive to verifying the encoded representation of the rolling code.

18. A method for controlling a moving barrier comprising:
generating, by a processor of a barrier operator controller, a plurality of output nibbles from a rolling code by:
- inverting bit positions of the rolling code,
- dividing the inverted code by a predetermined number;
- converting the divided inverted code to base 9 coefficients, and
substituting each of a plurality of base 9 coefficients in the divided converted code with an output nibble; and
responsive to actuation of a first actuator of the barrier controller operator:
transmitting, by a transmitter of the barrier operator controller to a receiver of a barrier operator, the plurality of output nibbles, receipt of the plurality of output nibbles causing the barrier operator to actuate a motor connected to a moving barrier.

19. The method of claim 18, wherein generating the plurality of output nibbles further comprises substituting each of the plurality of base 9 coefficients with an output nibble identified in a lookup table as corresponding to the base 9 coefficient.

20. The method of claim 18, wherein receipt of the plurality of output nibbles further causes the barrier operator to actuate the motor connected to the moving barrier to cause the moving barrier to stop, move toward an open position, or move toward a closed position.

* * * * *